(12) United States Patent
Schwank et al.

(10) Patent No.: US 9,080,773 B2
(45) Date of Patent: Jul. 14, 2015

(54) PITOT TUBE PRESSURE SENSOR FOR RADIANT TUBE HEATER

(75) Inventors: Bernd Schwank, Cologne (DE); Samer Hassan, Mississauga (CA); Fariborz Farshad, Toronto (CA)

(73) Assignee: Schwank Ltd., Mississauga (CA)

( * ) Notice: Subject to any disclaimer, the term of this patent is extended or adjusted under 35 U.S.C. 154(b) by 2212 days.

(21) Appl. No.: 12/056,619

(22) Filed: Mar. 27, 2008

(65) Prior Publication Data

US 2009/0241943 A1   Oct. 1, 2009

(51) Int. Cl.
| | |
|---|---|
| F02C 3/00 | (2006.01) |
| G01F 1/46 | (2006.01) |
| F24H 3/00 | (2006.01) |
| F23C 7/00 | (2006.01) |
| F24C 3/08 | (2006.01) |
| G01P 5/16 | (2006.01) |
| F23C 3/00 | (2006.01) |
| F23D 14/34 | (2006.01) |
| F23L 5/02 | (2006.01) |
| F23N 1/02 | (2006.01) |

(52) U.S. Cl.
CPC . *F24C 3/08* (2013.01); *F23C 3/002* (2013.01); *F23D 14/34* (2013.01); *F23L 5/02* (2013.01); *F23N 1/022* (2013.01); *G01F 1/46* (2013.01); *G01P 5/16* (2013.01); *F23N 2025/06* (2013.01); *F23N 2033/08* (2013.01); *F23N 2035/12* (2013.01)

(58) Field of Classification Search
USPC .......... 431/354, 10, 9, 12, 16, 19, 90, 431/351–353; 237/12, 70; 126/104 R, 126/104 A, 91 A, 116 A; 73/861.65–861.67
See application file for complete search history.

(56) References Cited

U.S. PATENT DOCUMENTS

| | | | | |
|---|---|---|---|---|
| 2,119,952 | A | | 6/1938 | Engels |
| 2,182,280 | A | * | 12/1939 | Chipley et al. ............. 73/861.65 |
| 2,529,942 | A | * | 11/1950 | Holthouse ........................ 261/30 |
| 2,964,103 | A | | 12/1960 | Ryder |
| 3,042,105 | A | | 7/1962 | Bitterlich |
| 3,081,766 | A | * | 3/1963 | Felkel et al. .................. 600/538 |
| 3,195,609 | A | | 7/1965 | Nesbitt |
| 3,227,202 | A | | 1/1966 | Morgan |

(Continued)

OTHER PUBLICATIONS

U.S. Appl. No. 11/831,130, Virag.

*Primary Examiner* — Christopher Jetton
(74) *Attorney, Agent, or Firm* — Gifford, Krass, Sprinkle, Anderson & Citkowski, P.C.

(57) ABSTRACT

A pitot tube assembly is provided for a radiant tube heater having a blower for providing combustion air to a burner. The assembly includes a mounting plate for attaching the assembly to a wall of a housing of the blower. First and second, substantially L-shaped pitot tubes extend through the mounting plate and are connected thereto and have respective inner leg sections which are arranged within an outlet section of the blower during use of the radiant tube heater. These leg sections extend in opposite directions to their respective pressure sensing ends. The first pitot tube measures impact pressure created by the blower and the second pitot tube measures static pressure. These tubes are connectible to a differential pressure switch arrangement for controlling operation of the burner. As part of a burner assembly, there is a mixing cup unit mountable within the burner tube of the heater and capable of mixing primary air and combustible gas. A gas valve unit regulates flow of the gas to the cup assembly.

13 Claims, 11 Drawing Sheets

(56) References Cited

U.S. PATENT DOCUMENTS

| | | | |
|---|---|---|---|
| 3,229,748 A * | 1/1966 | Spielman | 431/352 |
| 3,413,069 A | 11/1968 | Walsh | |
| 3,666,393 A * | 5/1972 | Davies | 431/90 |
| 4,059,386 A * | 11/1977 | Eising | 431/43 |
| 4,320,665 A * | 3/1982 | Cain | 73/861.04 |
| 4,705,022 A | 11/1987 | Collier | |
| 4,717,159 A * | 1/1988 | Alston et al. | 277/314 |
| 4,762,487 A | 8/1988 | Zappa | |
| 4,766,877 A | 8/1988 | Jensen | |
| 5,224,542 A | 7/1993 | Hemsath | |
| 5,361,750 A * | 11/1994 | Seel et al. | 126/91 A |
| 5,429,112 A * | 7/1995 | Rozzi | 126/116 A |
| 5,997,280 A * | 12/1999 | Welz et al. | 431/90 |
| 6,116,095 A * | 9/2000 | Radle | 73/861.01 |
| 2003/0175646 A1* | 9/2003 | Stephens et al. | 431/115 |
| 2005/0175944 A1* | 8/2005 | Ahmady | 431/18 |
| 2006/0266348 A1* | 11/2006 | Jauch et al. | 126/110 C |
| 2007/0287111 A1* | 12/2007 | Stone et al. | 431/18 |

\* cited by examiner

PITOT TUBE PRESSURE SENSOR FOR RADIANT TUBE HEATER

BACKGROUND OF THE INVENTION

This invention relates to burner assemblies for radiant tube heaters and, in particular, pressure sensors for use with such burner assemblies.

A known type of radiant heater for heating the interior of buildings and other areas is a so-called radiant tube heater which has a relatively long, radiant tube made of a suitable metal and adapted to enclose an elongate flame projected from a burner head. This heater includes a combustion air blower, a burner nozzle connected to a combustible gas supply through a gas valve unit, and a burner head connected to the nozzle. The nozzle and head are positioned in a combustion air duct section forming a passage for combustion air and the outlet of the blower is attached to an inlet end of this duct section so that the blower is able to direct combustion air through the duct section. The burner head which in an exemplary embodiment is arranged centrally in the air duct section, creates an annular passageway between itself and the air duct section. Combustible gas, such as natural gas, is delivered to the radiant heater through a gas valve governor which is connected by a line to the burner nozzle. Combustion air enters the burner head through vents or ports in the side wall of an inlet portion of the head and then mixes with the fuel, thereby producing a gas/air mixture which can exit through a perforated ceramic tile mounted in a downstream end of the head. The mixture is ignited by a suitable electrode resulting in a long laminer flame extending down the radiant tube.

One exemplary form of radiant tube heater is described and illustrated in co-pending U.S. patent application Ser. No. 11/831,130 filed Jul. 31, 2007 and the disclosure and drawings of this co-pending application are incorporated herein by reference. This radiant tube heater in addition to including the aforementioned features, employs a tubular arrangement that includes an air duct portion forming a combustion air passage and a radiant tube portion which is heated. An airflow restricting plate is mounted in the air duct portion and extends circumferentially around the burner head. This plate increases the flow of pressurized combustion air through the openings formed in the inlet portion of the burner head but also allows a substantial portion of the combustion air to flow downstream between the wider outlet portion of the head and the air duct portion.

The blower for the aforementioned radiant tube heater has a blower housing with a relatively straight, outlet section. Mounted on an outer wall of this outlet section are two pressure switches in the form of pitot tubes of standard construction. These switches are provided to ensure that the blower is in operation and is providing sufficient combustion air to the burner head when the mixture of combustion air and gas is ignited. The heater is constructed so as not to operate unless sufficient combustion air is being provided to the heater.

There is disclosed herein a pitot tube assembly for a radiant tube heater having a blower for providing combustion air to a burner assembly, this pitot tube assembly being constructed to provide a more accurate reading of static pressure when the tube heater is in use.

SUMMARY OF THE INVENTION

According to one embodiment of the invention, a pitot tube assembly for a radiant tube heater having a blower for providing combustion air to a burner assembly includes a mounting plate for attaching the pitot tube assembly to a wall of a housing of the blower. The assembly further includes first and second, substantially L-shaped pitot tubes that extend through the mounting plate and are connected thereto. These tubes have respective inner leg sections which are arranged within an outlet section of the blower during use of the radiant tube heater and which extend in opposite directions to their respective pressure sensing ends. The first pitot tube is adapted to measure impact pressure created by the blower and the second pitot tube is adapted to measure static pressure during use of the blower. These pitot tubes are adapted for connection to a differential pressure switch arrangement for controlling operation of the burner assembly.

In an exemplary version of this pitot tube assembly, the mounting plate is flat and is sized to close both a relatively small hole and a separate, larger elongate slot in the wall of the housing during use of the assembly. During such use, the first pitot tube extends through the slot and the second pitot tube extends through the small hole.

According to another embodiment of the invention, a heating assembly for a radiant tube heater having a radiant heating burner tube with an upstream end includes a mixing cup assembly adapted for mounting within the burner tube and adapted for mixing primary air and combustible gas and for delivering the resulting mixture into an upstream end section of the burner tube. A gas line for introducing the combustible gas into the mixing cup assembly has an upstream first end and a downstream second end terminating in the mixing cup assembly. A gas valve unit is provided for a connection to the first end of the gas line and for regulating flow of the combustible gas to the mixing cup assembly. A blower is able to provide the primary air for combustion to the mixing cup assembly and includes a blower housing with a blower outlet section adapted for connection to the upstream end of the burner tube. The heating assembly also includes a pressure sensor system for controlling the gas valve unit, this system including a differential pressure switch arrangement and a pitot tube assembly mounted on the blower outlet section so as to extend through a wall of this outlet section. The pitot tube assembly is operatively connected to the pressure switch arrangement and includes first and second substantially L-shaped pitot tubes having respective inner leg sections located within the blower outlet section and extending in opposite directions to their respective pressure-sensing ends. The first pitot tube is adapted to and mounted to measure impact pressure created by the blower during use of the heating assembly and the second pitot tube is adapted to and mounted to measure static pressure during use of the heating assembly. The pitot tube assembly is adapted to sense pressure changes and to provide details of these changes to the differential pressure switch arrangement for controlling operation of the gas valve unit.

In an exemplary version of this heating assembly, the blower outlet section has a mounting flange plate on a downstream end thereof for connecting the blower housing to the upstream end of the burner tube. The inner leg section of the second pitot tube extends through a blower outlet opening formed in the flange plate.

Further features and advantages will become apparent from the following detailed description of an exemplary embodiment of the invention taken in conjunction with the accompanying drawings.

BRIEF DESCRIPTION OF THE DRAWINGS

FIG. 4 is an axial cross-section of the burner head of FIG. 3a;

DETAILED DESCRIPTION OF EXEMPLARY EMBODIMENTS

In the detailed description which follows, exemplary embodiments are described, particularly with reference to the figures appended thereto. However, the particularly described embodiments are merely illustrative of radiant tube heaters and pitot tube assemblies for sensing pressure constructed according to the present disclosure.

Figure 1:
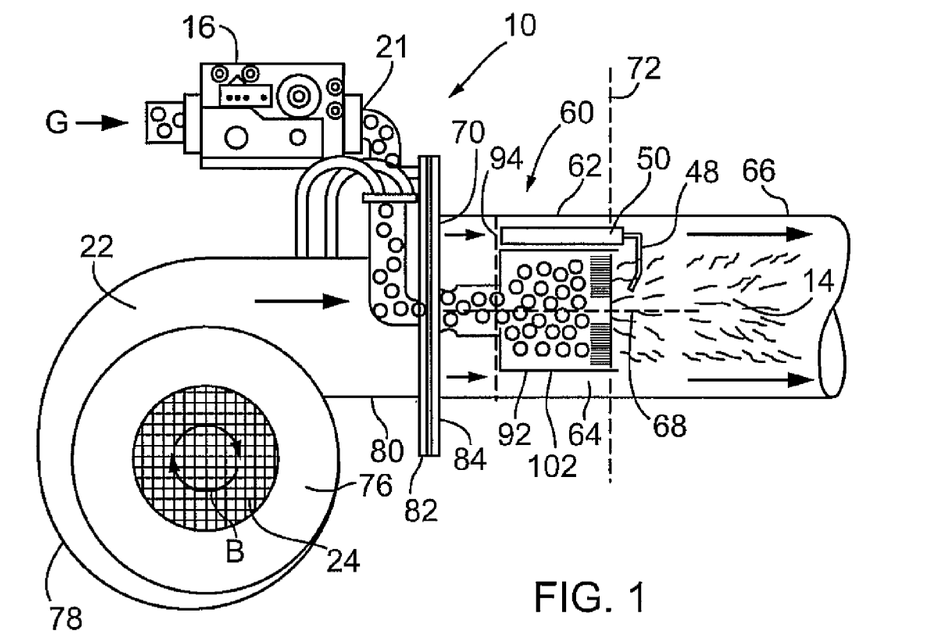
FIG. 1 is a schematic, cross-sectional view of a radiant tube heater in use, this view showing an elongate laminar flame extending from a burner head, a major portion of the radiant tube being omitted along with its reflector/shield for illustration purposes.
Figure 2:
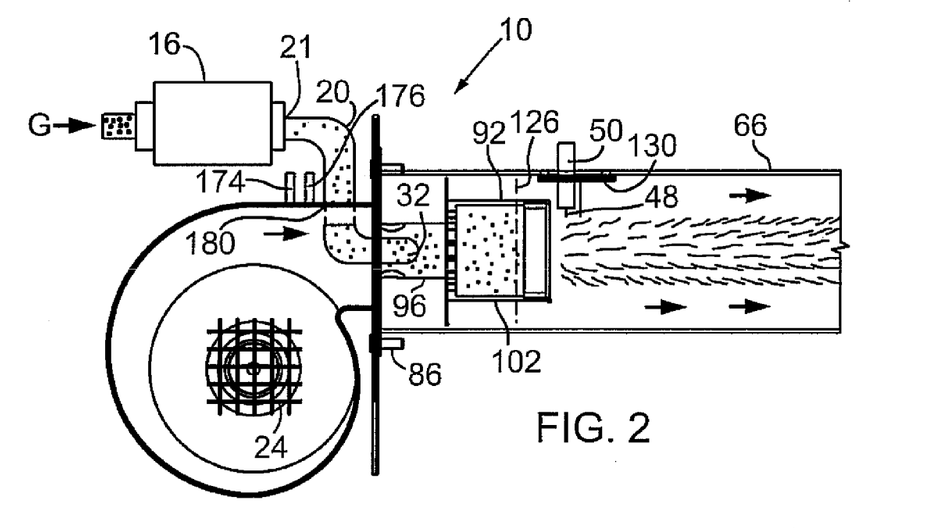
FIG. 2 is another schematic cross-sectional view similar to FIG. 1 showing another embodiment of a radiant tube heater.

Referring now to the drawings, wherein like reference numerals identify similar structural elements of the heating units, FIGS. 1 and 2 illustrated schematically embodiments of radiant tube heaters constructed in accordance with co-pending U.S. patent application Ser. No. 11/831,130 filed Jul. 31, 2007. The radiant tube heater includes an elongate heating tube 66, only an upstream portion of which is shown for ease of illustration. This cylindrical tube can comprise several sections arranged end to end. The length of a heating tube can extend ten feet or more and the tube encloses an elongate flame 14 during use. The tube is heated by the flame and combustion gases to emit infrared radiant heat. Preferably the tube is located within or under a downwardly opening, trough-shaped reflector/shield such as that shown in FIG. 15. This reflector/shield of the heater receives upwardly-directed radiant energy from the tube and reflects or radiates this energy downwardly to an area or region requiring heating. Also shown is a gas valve governor, also referred to herein as a gas valve unit 16 for the heater which is adapted for connection to a first end 21 of a gas pipe or gas line 20, this line extending to a burner nozzle at 32 and a burner head 92 mounted on the nozzle. The heating assembly in each of FIGS. 1 and 2 includes a blower or blower fan 22 having a side air inlet 24 into which external air is drawn. The blower has an outlet section which extends tangentionally relative to the blower fan and which is connected to the upstream end of the burner tube 66.

The burner head or mixing cup assembly 92 is adapted for mounting within the burner tube 66 and is adapted for mixing primary air and combustible gas and for delivering the resulting mixture into an upstream end section of the burner tube as shown. The burner head is generally annular and has a cylindrical inlet portion 96 and a wider cylindrical outlet portion 102 integrally connected to the inlet portion and located at the downstream end of the inlet portion. The aforementioned nozzle 32 extends into the inlet portion and can be connected thereto by a thread connection, including internal threads 108 formed at the upstream end section of the inlet portion 96 (see FIGS. 3a and 3b).

It will be understood that the heater is provided with natural gas or LPG gas indicated by the arrow G taken from a suitable source and delivered through the gas valve governor 16 and the pipe or line 20 to the burner nozzle. Combustion air enters through vents or ports distributed about the periphery of the inlet portion 96. In the burner head, the gas intermingles with the combustion air to produce a gas/air mixture that exits the burner head through a perforated ceramic tile 46 located at the downstream end of the outlet portion 102. The exiting mixture is ignited by an ionization electrode 48 of an igniter 50 so as to produce a long laminar flame that extends substantially the length of the tube 66. The preferred material for the radiant tube is stainless steel or aluminized steel, at least for an upstream section thereof that surrounds the flame and the burner head. The remaining downstream section can be cold rolled steel. A typical dimension for such a heating tube is four inches in diameter and the tube sections can be provided in standard lengths of ten feet each which are connected together end-to-end. Typically two to five such radiant tube sections are connected together to form a complete heating tube which can be connected at the downstream end to a suitable exhaust pipe or passage.

The illustrated heating tube is an elongate tubular arrangement that includes an air duct portion 62 forming a combustion air passage and a radiant tube portion which is the portion actually heated by and surrounding the laminar flame during use of the heater and which extends downstream of the air duct portion in relation to the flow of combustion air in the air passage 64. The air duct section has a central longitudinal axis indicated at 68 in FIG. 1, an inlet end 70 forming an air inlet for receiving combustion air and an opposite end located approximately at the dash line 72 where the air duct portion integrally connects to the radiant tube portion.

Figure 6:
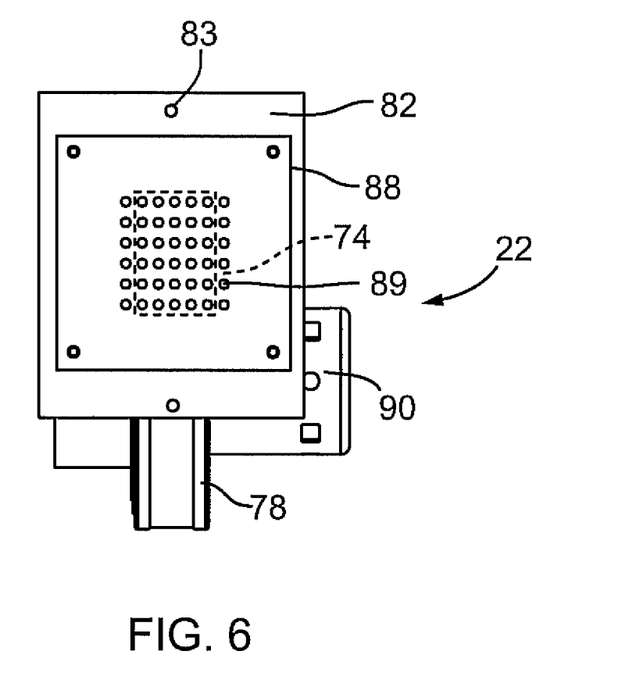
FIG. 6 is an end view of the blower of the radiant tube heater, together with its mounting flange or mounting plate.
Figure 7:
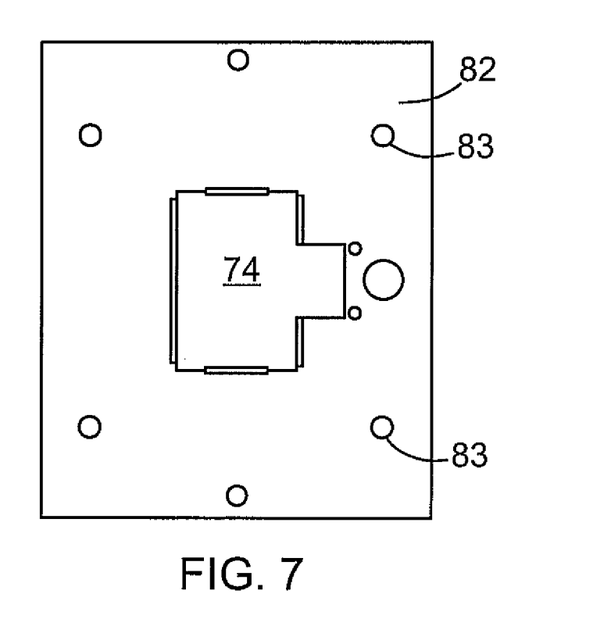
FIG. 7 is a detail view of one form of mounting flange for the blower, this view showing the downstream side.

The blower 22 has an air outlet 74 which can be rectangular as shown in FIGS. 6 and 7. The blower is able to provide pressurized combustion air to the inlet end of the air duct section and its housing is sealingly connected to this air duct section at the inlet end 70 thereof. The blower can include a blower fan 75 of the squirrel cage type, a radial cross-section of which can be seen in FIG. 10. The direction of rotation of the fan is indicated by the arrows B in FIG. 1. The blower includes a blower casing or housing 78 having an outlet section 80 forming the blower outlet. The blower can include an attachment arrangement for connecting the outlet section 80 to the inlet end of the air duct portion 62. This attachment arrangement can include a rectangular mounting flange 82 that extends around the outlet formed by outlet section 80. The mounting flange 82 is connected by means of bolts 86 to a mounting flange 84 provided at the inlet end of the burner tube. The flange plate 82 shown in FIGS. 6 and 7 has six bolt holes 83 to accommodate six of the connecting bolts 86 but the number of holes can be fewer or more. Nuts (not shown) are threaded onto these bolts in order to connect the two mounting flanges together. An equalizer plate 88 shown in FIG. 6 has an array of air holes 89 formed therein for the passage of combustion air. This plate can be mounted between the two mounting flanges 82, 84 and held in place by at least some of the bolts 86. The function of this equalizer plate is to help distribute the combustion air evenly across the height and width of the air duct section 62. The blower can be powered by an electric motor 90 which in one embodiment is a ⅓₅ hp, 120 V 60 Hz motor.

Figure 3A:
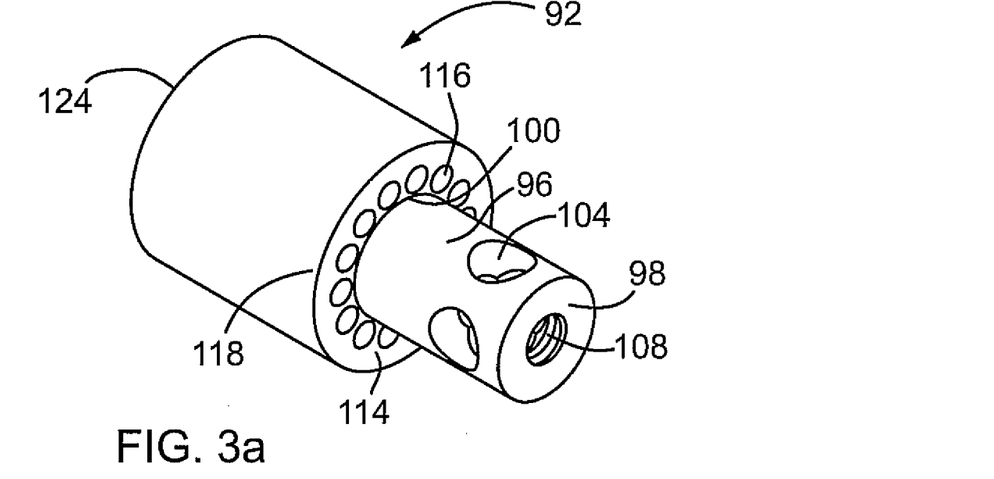
FIG. 3a is a perspective view of the burner head taken from one side and from the upstream end.
Figure 9:
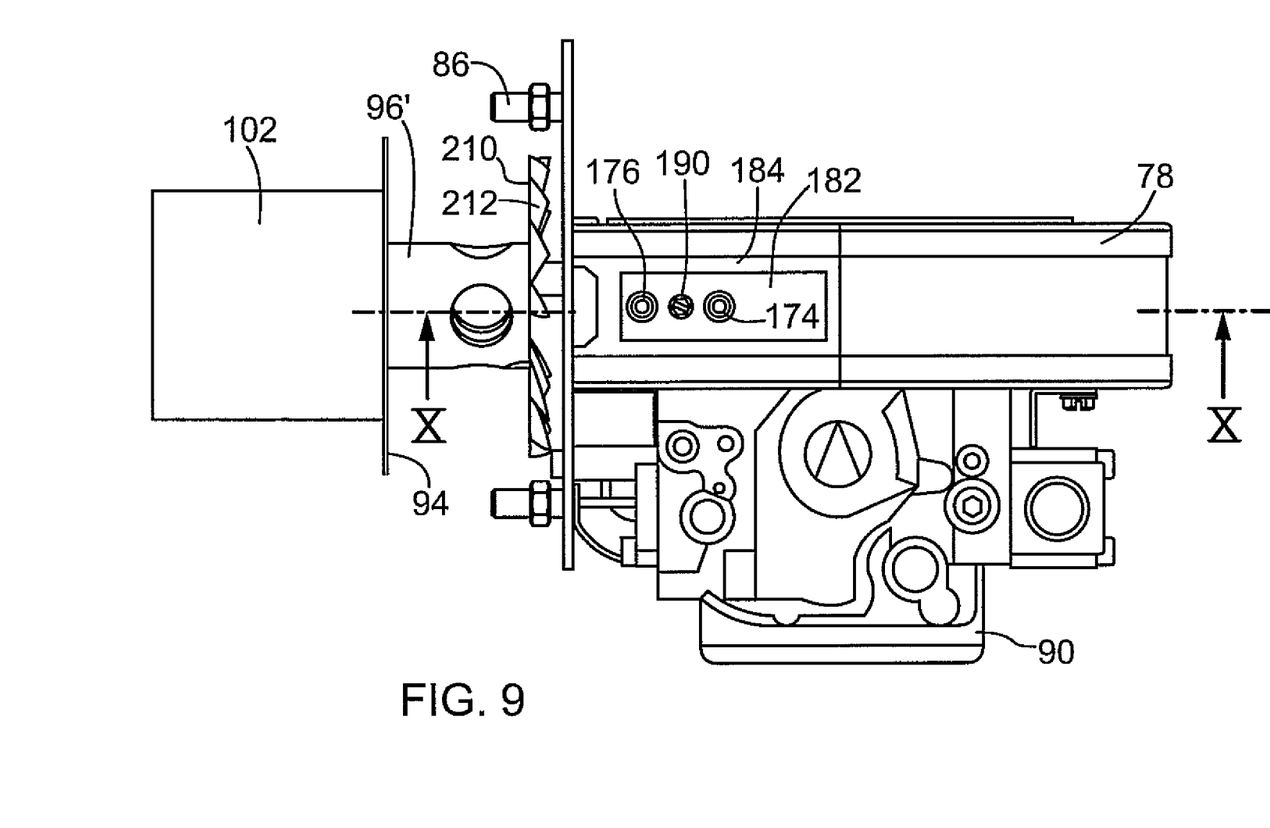
FIG. 9 is a side view of the burner head and the blower of FIG. 8, together with its mounting flange, this view showing a pitot tube assembly mounted on an outlet section of the blower housing.
Figures 15, 16:
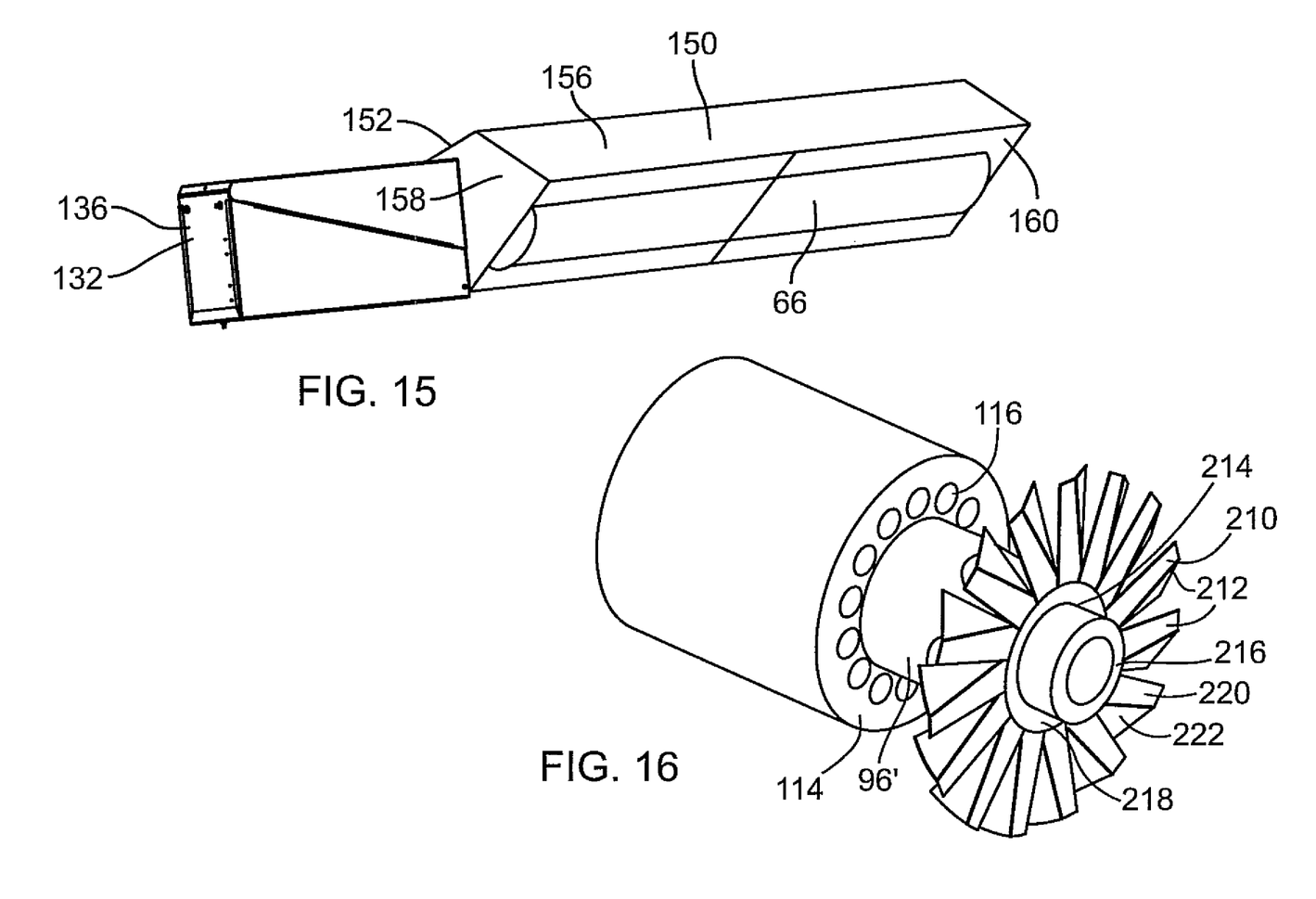
FIG. 15 is a perspective view showing the housing of FIG. 14 in the closed position, a reflector/shield extending from the housing and an elongate radiant tube arranged within the reflector/shield.
FIG. 16 is a perspective view of the burner head fitted with a diverter ring at its upstream end.

FIGS. 3a to 5 illustrate one embodiment of the burner head 92 for the tube heater while a variant of this burner head is shown in FIGS. 9 and 16. As seen in FIG. 3a, the inlet portion 96 of the burner head has an upstream end 98 and a downstream end 100. The substantially cylindrical outlet portion 102 is located at the downstream end of the inlet portion. The diameter of the outlet portion is substantially greater than the transverse dimensions of the inlet portion which also has a cylindrical exterior. In the illustrated embodiment there are four openings or ports 104 distributed about the periphery of the inlet portion for passage of combustion air into the burner head but there could be fewer or more of these ports. Extending along the longitudinal center line of the inlet portion is an axial passage 106 which is open ended. At the upstream end, this passage is threaded at 108, these threads being used to attach the nozzle 32 which has exterior threads.

Figure 5:
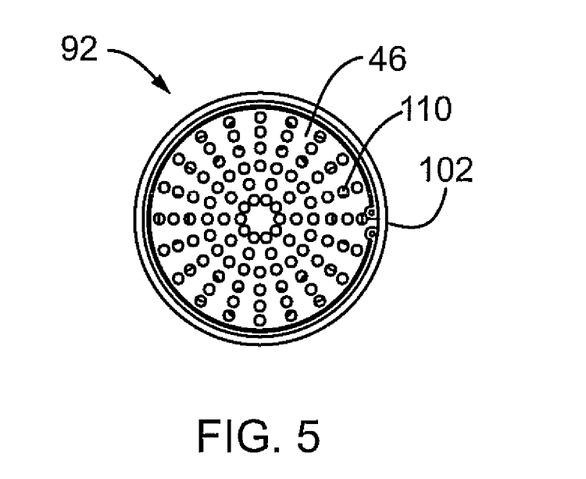
FIG. 5 is a downstream end view of the burner head.

The outlet portion 102 is substantially hollow, except for the perforated ceramic tile 46. This tile has an array of small holes distributed in a radial and circumferential pattern over its surface as shown in FIG. 5. These holes allow a mixture of combustion air and gas to flow smoothly and evenly out of the burner head. If desired, the tile can be formed with a cylindrical center hole which in one embodiment has a diameter of ⅜ths inch. This center hole can be desirable for burners with a low firing input rate and can be omitted in burners with a high firing rate. The tile can be held in the end section of the burner head using any one of several possible attachment techniques. For example, the internal wall of the burner head can be formed with a downstream facing shoulder at 112 to engage and locate one side of the tile. Near the downstream end of the outlet portion there can be formed an internal circumferential groove to receive a clip such as a flexible metal C-clip which is sized to fit into the groove and to engage and hold the downstream face of the tile. Alternatively, the tile could be formed with radially extending holes in its circumferential edge to accommodate short threaded fasteners that extends through the wall of the outlet portion into the tile.

Figure 3B:
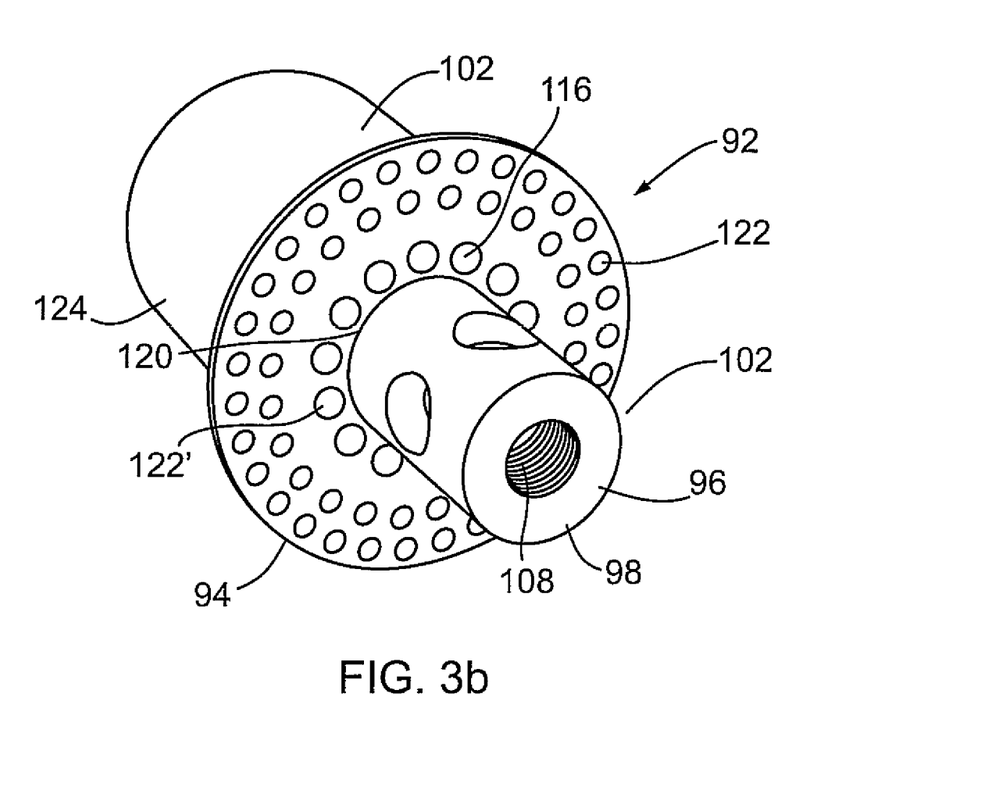
FIG. 3b is a perspective view similar to FIG. 3a but showing a restricting plate mounted on the burner head.
Figure 4:
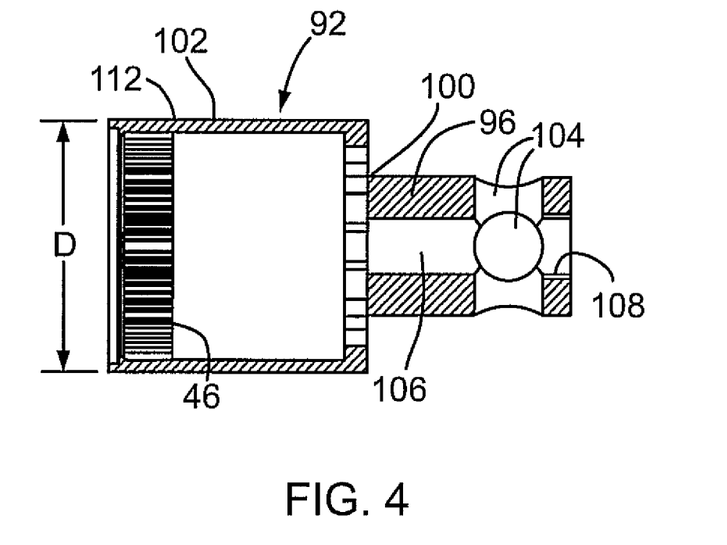

The inlet and outlet portions of the burner head are rigidly and integrally connected to each other by an annular disk or wall 114 having a plurality of apertures 116 formed therein as shown in FIGS. 3a and 16. The arrangement of the wall 114 allows a flat restricting plate 94 to be mounted immediately against the wall as shown in FIG. 3b. The burner head, as illustrated, can be connected to and supported by the burner nozzle 32 but it can be supported by other means, for example, by securing it to the aforementioned restricting plate 94 and then securing the restricting plate to the air duct section.

The illustrated restricting plate 94 has a circular perimeter and is an annular plate with a central circular hole at 120 having a diameter slightly greater than the diameter of the inlet portion 96. The plate 94 substantially spans the combustion air passage 64 between the burner head and the air duct section. The plate is formed with an array of air holes 122 distributed over the plate for the passage of combustion air through the plate. The radial innermost holes 122' can be the same in number and size as the apertures 116 formed in the radial wall 114 but it is possible to have fewer holes 122' for some burner applications. By providing fewer holes 122', the plate can be used to restrict air flow into the outlet portion. The holes 122' are aligned with some or all of the apertures 116 so that combustion air can flow through them. Two outermost rows of air holes 122 are located beyond the circumferential perimeter of the outlet portion and these holes allow a substantial laminar air flow downstream of the restricting plate around the circumference of the outlet portion 102. Depending on the burner performance requirements, the number of these holes can be increased or decreased and there may be only one outer row of holes beyond the circumference of the outlet portion. The presence of the plate 94 increases the flow of pressurized combustion air through the ports 104 in the inlet portion and this increases the efficiency of the burner by providing turbulent flow in at least a central region of the outlet portion which improves mixing.

It is possible and sometimes desirable to mount the restricting plate 94 downstream from the position shown in FIG. 1 and along the exterior of the outlet portion 102. One such alternative location is indicated by the dash line 126 in FIG. 2. When the restricting plate is in the position shown in FIGS. 1 and 3b, it can be secured in this position by a small screw, not shown, extending through a hole in the plate and extending into the annular wall 114. There are various possible ways of securing the restricting plate midway along the outlet portion as shown in FIG. 2, for example, by forming a shoulder on the exterior of the outlet portion against which the restricting plate can rest. The plate can be held against this shoulder by means of a C-clip mounted in a groove formed about the exterior of the outlet portion. The restricting plate can be located at the juncture between the inlet portion and the outlet portion when the heater has a burner with high firing input rates, for example, in the range of 130 and 200 BTU/hour. For lower firing input rates, it can be desirable to move the restricting plate further downstream.

The radiant tube heater can be provided with an igniter 50 for mounting adjacent to the burner assembly for igniting the mixture of combustible gas and air. The igniter has an electrode 48 extending therefrom and projecting in front of the ceramic tile. In the embodiment shown in FIG. 1, the igniter is secured to the side of the burner head. In the exemplary embodiment shown in FIG. 2, the igniter is secured to the radiant tube 66 and projects through a hole in the tube. A mounting plate 130 is used to mount the igniter on the wall of the tube so that the igniter projects into the radiant tube portion. The mounting plate can be secured in position by means of screws.

Figure 13:
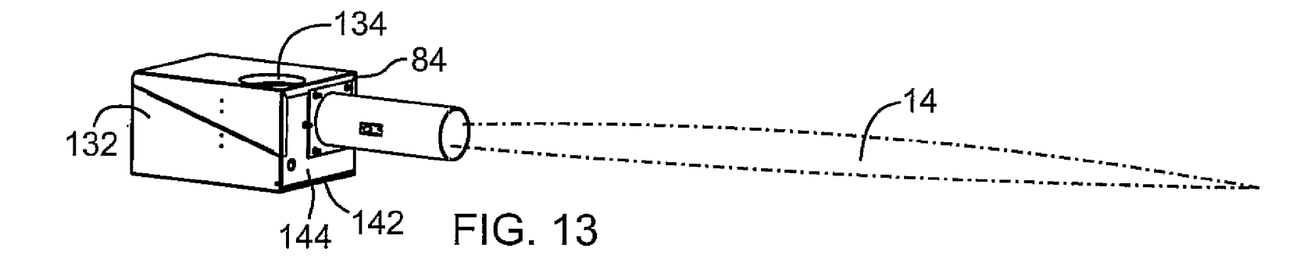
FIG. 13 is a perspective view showing a housing for the blower and its motor and a portion of the radiant tube which extends from one end of this housing.
Figure 14:
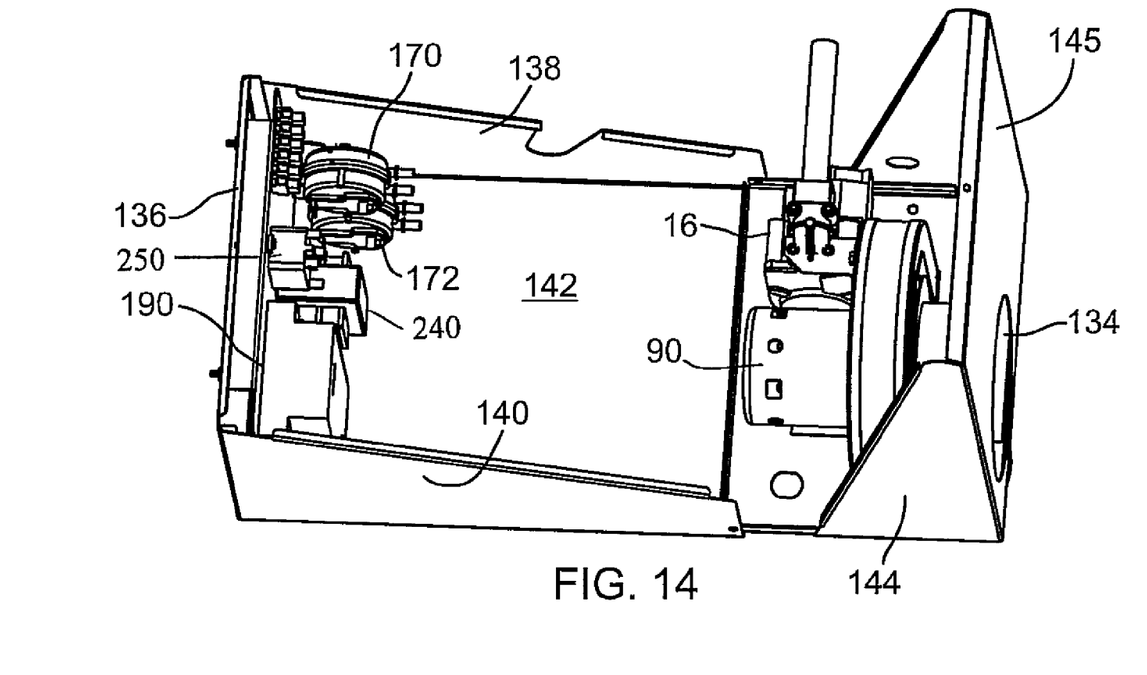
FIG. 14 is a perspective view of the housing of FIG. 13 with the housing being shown in an open position showing the location of the blower and other components of the heater unit.

Shown in FIGS. 13 to 15 is one form of housing 132 in which can be mounted the blower. This housing is shown in a closed position in FIGS. 13 and 15 and in a swung open position in FIG. 14. The inlet of the blower extends to a side opening 134 in the housing so that exterior air can flow into the blower. The illustrated housing has a rectangular end wall 136 and two opposite side walls 138, 140 connected to the end wall. Also extending between the side walls is a rectangular wall or panel 142. Pivotably attached to the ends of the sidewalls is an end portion 144 and on this end portion can be mounted the blower. The end portion includes a plate 145 in which the opening 134 is formed. Since the blower outlet is normally attached to the burner tube, the end portion 144 is normally fixed in position while the blower cover formed by the walls 136 to 142 is pivotal from the closed position of FIGS. 13 and 15 to an open position.

There can be attached to the fixed end portion 144 a reflector/shield 150 which in use receives upwardly directed radiant energy from the radiant heating tube 66. The shield can have side walls 152, 156 and end walls 158 and 160 and these walls can be formed with polished, reflecting interior surfaces in order to radiate the radiant energy downwardly or towards any desired location. The reflector/shield can be a trough-shaped channel which is open on the downward side.

Also shown mounted to the interior of the housing 132 are two differential pressure switches 170, 172 which can be of standard construction and which together provide differential pressure switch means for controlling the gas valve unit. These switches are provided to ensure the blower is in operation and is providing sufficient combustion air to the burner head when the mixture of combustion air and gas is being ignited. The switches are connected by flexible tubes to two pitot tubes 174, 176 which are part of a pitot tube assembly illustrated separately in FIGS. 11 and 12. The pitot tubes provide pressure sensors which are part of the control system for the heating assembly. The radiant heater is controlled so that it will not operate unless sufficient combustion air is being provided to the radiant heater by the blower. Also shown in FIG. 14 is an electrical controller 190 used to electronically control the operation of the radiant tube heater. This controller is connected to receive electrical signals from the pressure switches 170, 172.

The aforementioned pitot tubes, which can be referred to as first pitot tube 174 and second pitot tube 176 are part of a pitot tube assembly 180 for the radiant tube heater. This assembly, in addition to the pitot tubes, includes a mounting plate 182 for attaching the assembly to a wall 184 of the blower casing. As illustrated, the mounting plate is flat and rectangular and is sized to close both a relatively small hole 186 and a separate, larger elongate slot 188 in the wall 184 (see FIG. 8) of the casing during use of the pitot tube assembly. It will be understood that in order to install the pitot tubes, the second pitot tube 176 is manipulated through the hole 186 and, once this is done, the first pitot tube 174 can be inserted through the slot. The mounting plate can then be secured to the wall by means of fastener means such as a single screw 190. Because of the extended length of the mounting plate, the slot is entirely closed off and effectively sealed.

Figure 10:
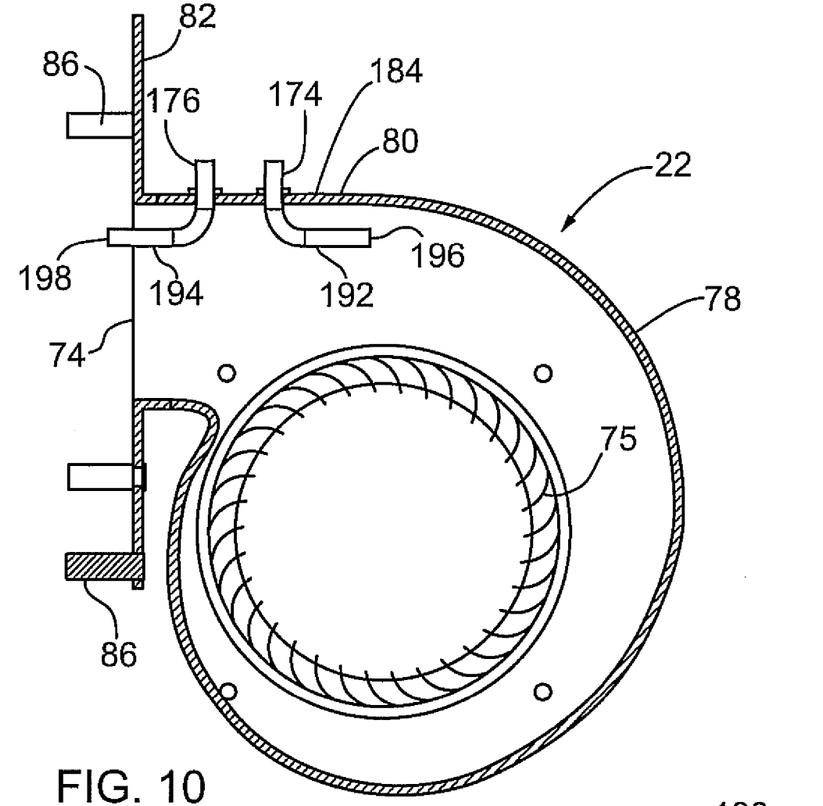
FIG. 10 is a cross-sectional view of the blower and its mounting flange, this view being taken along the line X-X of FIG. 9.
Figure 12:
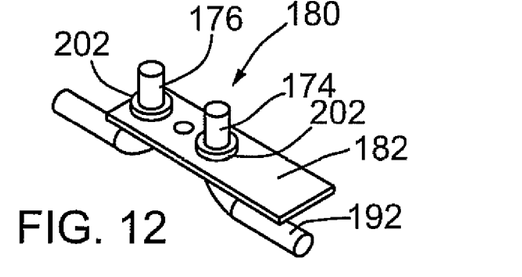
FIG. 12 is a perspective view of the pitot tube assembly, this view showing the side of the mounting plate which faces away from the blower housing.

The pitot tubes are substantially L-shaped as can be seen clearly in FIGS. 10 and 12. Each has an inner leg section 192, 194 and a further leg section which extends through the wall of the casing. The two leg sections are joined at a rounded corner which bends to an angle of 90° approximately. The inner leg sections are arranged within the outlet section 80 of the blower during use of the radiant tube heater and they extend in opposite directions to their respective pressure sensing ends 196, 198. The first pitot tube 174, which is closest to the fan wheel, is adapted to measure impact pressure by the blower while the second pitot tube 176 is adapted to measure static pressure. As indicated, the tubes are operatively connected to the differential pressure switches which act to control the operation of the burner assembly. It will be understood that the pivot tube assembly and, in particular the pitot tubes, are adapted to sense pressure changes and to provide details of these changes to the differential pressure switches.

As can be seen from FIG. 10, the inner leg section 194 of the second pitot tube extends through the air outlet or blower outlet 74 formed centrally in the mounting flange plate 82. By making the pitot 176 L-shaped and placing its pressure sensing end 198 in the illustrated position, a more accurate static pressure reading can be obtained by this pressure sensor. This is believed to be due to the fact that the pressure sensing end 198 is placed further from the blower fan 75 and thus the air flow in the vicinity of the end 198 is less turbulent than the air flow closer to the fan. The result of this pitot tube arrangement is better control of the gas valve unit by the pressure switches.

Figure 11:
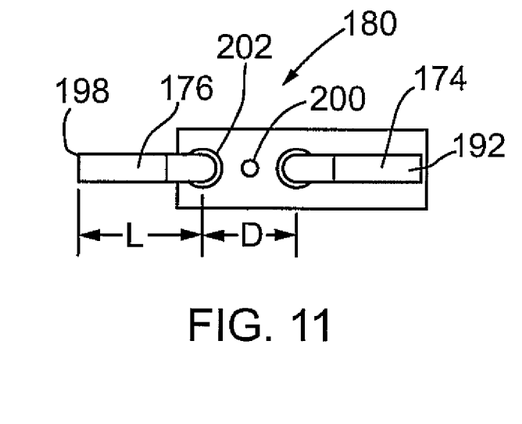
FIG. 11 is an inner side view of a pitot tube assembly, this view showing the side of its mounting plate which faces the blower housing wall.

Also shown in FIGS. 11 and 12 is a fastener hole 200 through which the screw 190 extends to attach the mounting plate. Welding or brazing at 202 can be used to sealingly connect each pitot tube to the mounting plate. In one exemplary embodiment of the pitot tube assembly the length of the mounting plate was 2.4 inches and the length L of the inner leg section 194 measured from the axial center line of the outwardly projecting leg section is about 1.2 inch. The distance D between the two parallel center lines of the outwardly projecting legs of the pitot tubes is about 0.9 inch.

Figure 18:
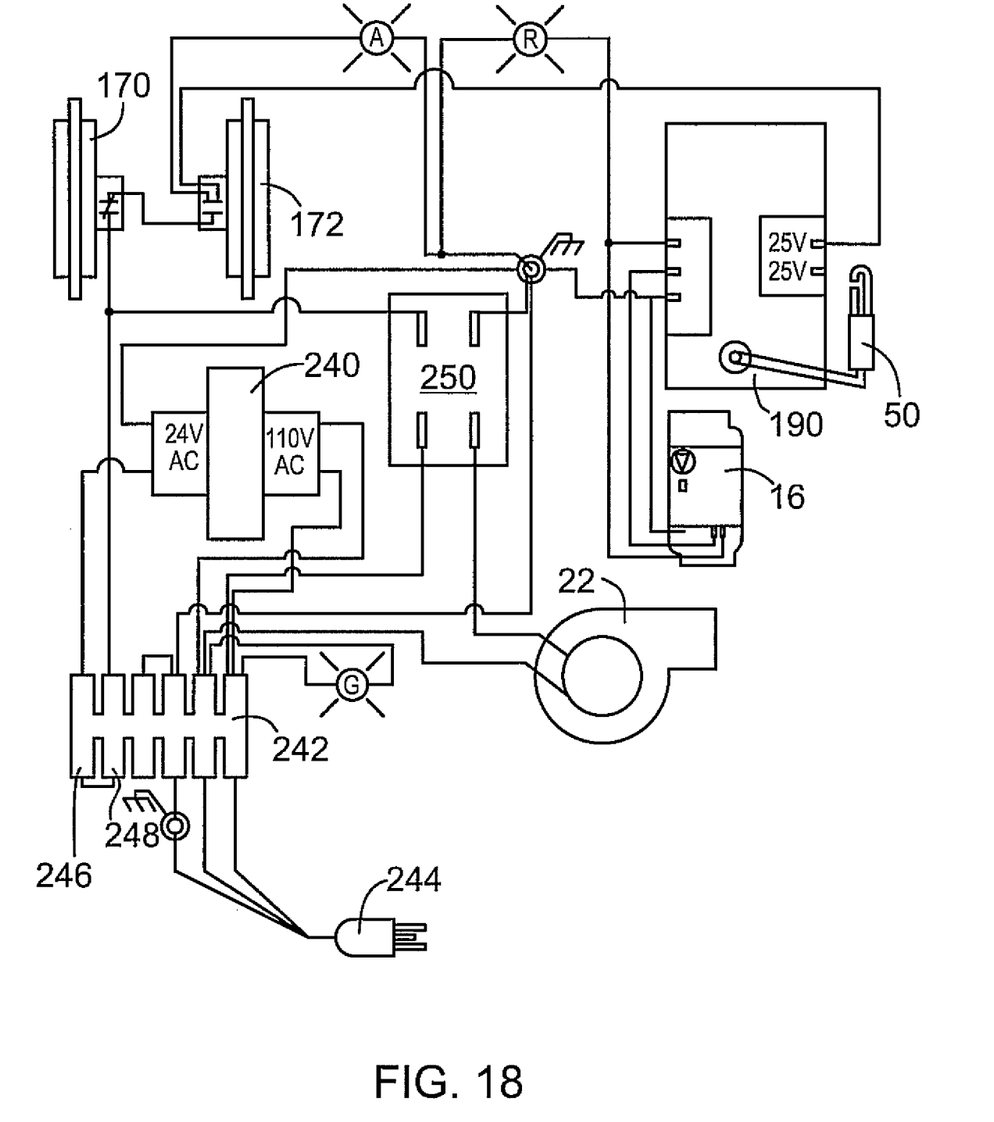
FIG. 18 is an electrical circuit diagram illustrating the control circuit for the radiant tube heater.

FIG. 18 illustrates an exemplary form of an electrical circuit for one embodiment of the radiant tube heater. This embodiment is powered by a 24 volt AC transformer 240 which is powered by 110 volt line voltage through a terminal block 242 to which electrical plug 244 is connected. The burner can be activated when a 24 volt thermostat calls for heat and this thermostat can be connected at 246, 248. In the alternative, if a line voltage thermostat is used, a jumper connects the terminals at 246, 248 and the line voltage thermostat is installed in series with the power supply. On a call for heat, the control system will delay start up to provide a 30 second system pre-purge. When the burner is activated by the thermostat or a call for heat, the transformer 240 provides power to an electronic circuit including a direct spark ignition (DSI) control 190 and safety lockout timing begins. At the same time the control module for the burner opens the main gas valve 16 allowing gas to flow to the burner. The control module for the unit performs several basic functions including providing the aforementioned 30 second system pre-purge, supplying power to the electronic pulse-generator control 190 for spark ignition (30,000 volts open circuit), and allowing 21 seconds for ignition trial before system safety lockout occurs. The control module is also able to sense the burner flame for safe lighting and to shut off the spark after the burner is lit.

The operating sequence then for the exemplary form of burner is that, upon a call for heat from the online voltage thermostat or an on/off switch, the blower 22 and the transformer 240 are powered simultaneously with 115 volts. Alternatively, if a 24 volt thermostat is used, the line voltage will power the transformer 240 and the 120 volt side of a blower switching relay 250 simultaneously. The call for heat by the 24 volt thermostat energizes the 24 volt control circuit and the 24 V/120 volt relay 250 powering the blower. The 24 volt control circuit powers the DSI control 190 in series through the normally open air pressure switch (APS) 172 and the normally closed blocked flue switch 170. Proper operation of the blower 22 creates a positive pressure and closes a normally open contact inside the APS 172. The 24 volt supplied to the DSI control 190 initiates the aforementioned 30 second pre-purge cycle. After this cycle is completed the DSI control 190 generates high voltage to the spark igniter and 24 volts to energize the gas valve 16. The burner will then light and establish a steady flame. Once a flame sensor determines there is a steady flame established, with a minimum flame signal of 1.5 uA, the spark igniter 50 is then de-energized. In the event ignition does not occur, a safety circuit will function to interrupt gas flow after approximately 21 seconds and lock the system out. No further gas will flow until the power has been manually interrupted for a period of 30 seconds. This will reset the ignition module and the operating sequence will restart. If the blower does not run, the APS 172 does not close and power is not supplied to the ignition control.

The clear advantage of using the pitot tube assembly illustrated in FIGS. 10 to 12 was established by comparative tests measuring real time in seconds to obtain a pressure reading of 0.7 inches water column. The results of these tests are reflected in table 1 set out below:

TABLE 1

| | Test Number | | | | | | | | | |
|---|---|---|---|---|---|---|---|---|---|---|
| | 1 | 2 | 3 | 4 | 5 | 6 | 7 | 8 | 9 | 10 |
| two-curved pitot tube | 2.60 | 2.80 | 2.84 | 2.80 | 2.62 | 2.65 | 2.72 | 2.82 | 2.8 | 2.75 |
| One-curved pitot tube | 3.1 | 3.15 | 3.25 | 2.98 | 2.99 | 3.25 | 3.20 | 3.15 | 3.30 | 3.29 |

Figure 17:
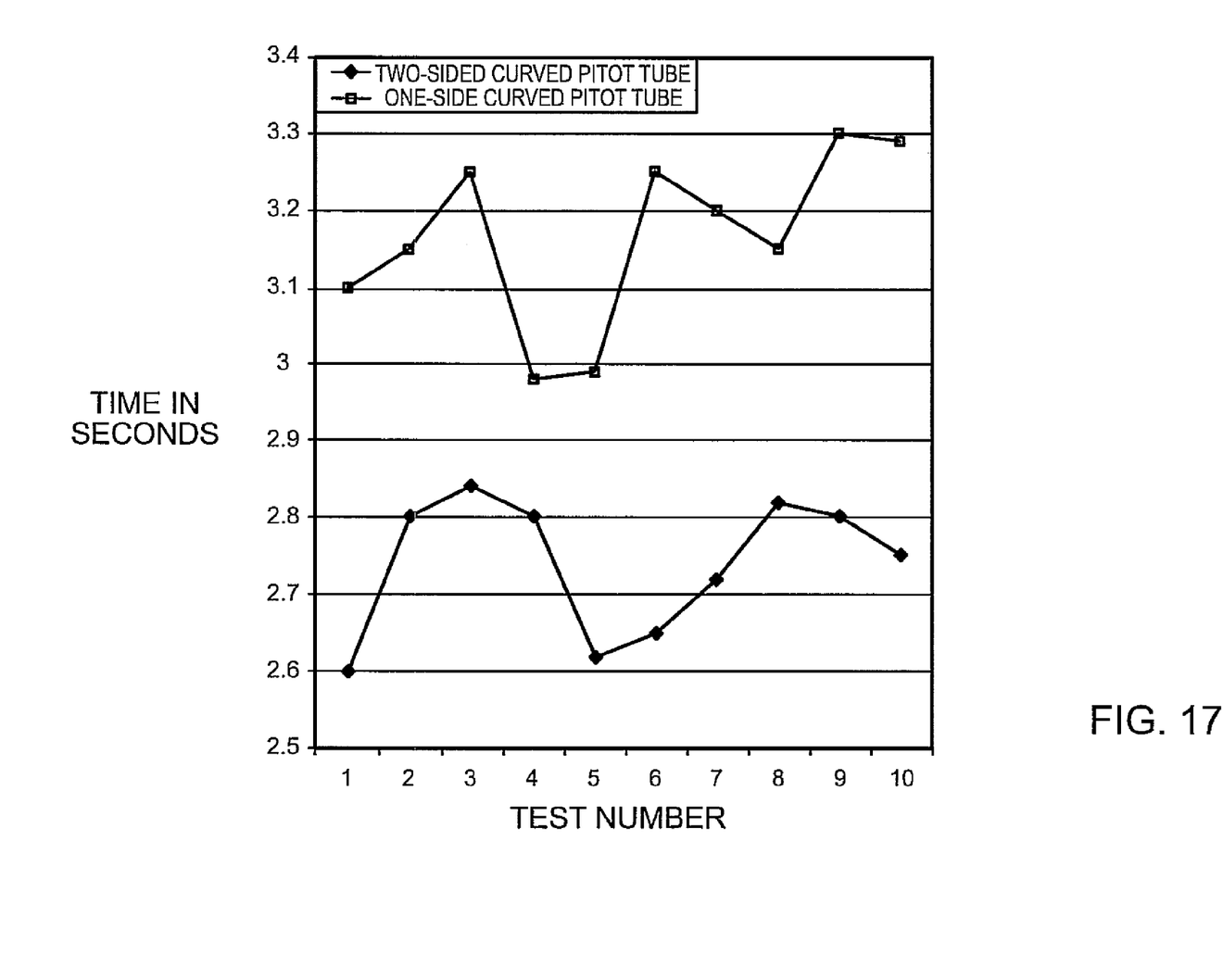
FIG. 17 is a graph showing real times in seconds to obtain pressure readings in ten tests of the burner assembly using a pitot tube assembly with one bent tube and using an assembly with two bent tubes.

As indicated in table 1, the real time results of using a pitot tube assembly with two-curved pitot tubes was compared to the results of a two pitot tube assembly wherein only the pitot tube 174 is curved, that is the pitot tube connected to air proving switch 172. It was indicated by these tests that the average time for the two curved pitot tubes assembly is 2.74 seconds while the average time for the one curved pitot tube assembly (with one straight tube) is 3.166 seconds. The difference of 0.426 seconds or 426 milliseconds is important in controlling combustion to avoid the affects of backfire in the radiant tube heater. The aforementioned test results are also reflected in the graph of FIG. 17.

FIGS. 9 and 16 illustrate an exemplary feature of the burner assembly. In order to improve the distribution of the combustion air across the height and width of the air duct portion 62, there can be provided a diverter ring 210 having a number of diverter blades 212 extending about its circumference. This ring can be made from a single metal plate which is preferably aluminized steel. It has a central circular hole at 214 through which a reduced cylindrical end section 216 of a modified burner head extends. Surrounding the central hole in the plate is an annular connecting section 218 of the plate, the blades extending outwardly from this connecting section. As shown, each blade has a first section 220, which extends in the same radial plane as the connecting section and a second sloping section 222. The blades can be made by a straightforward metal stamping process. It is also possible to construct the diverter ring wherein the whole of each blade extends at an angle to the radial plane. The blades help to circulate and mix the incoming combustion air and help to prevent backfire because of the improved circulation. The ring does not rotate and is in fact fixedly held in position by means of a screw (not shown) that extends through the connecting section 218 and into the rearwardly facing shoulder formed on the inlet portion 96'. The slope of the angular portion of each blade can vary and typically is 30, 45 or 60 degrees relative to the plane of the flat first section 220 of the blade. The best angle for a particular burner application can be determined by trial and error. These diverter rings are only for low firing rate burners, typically in the 60,000 to 90,000 BTU range.

Aluminized steel for the diverter is preferred as it can withstand the heat given off by the burner and it will not corrode in this environment.

Figure 8:
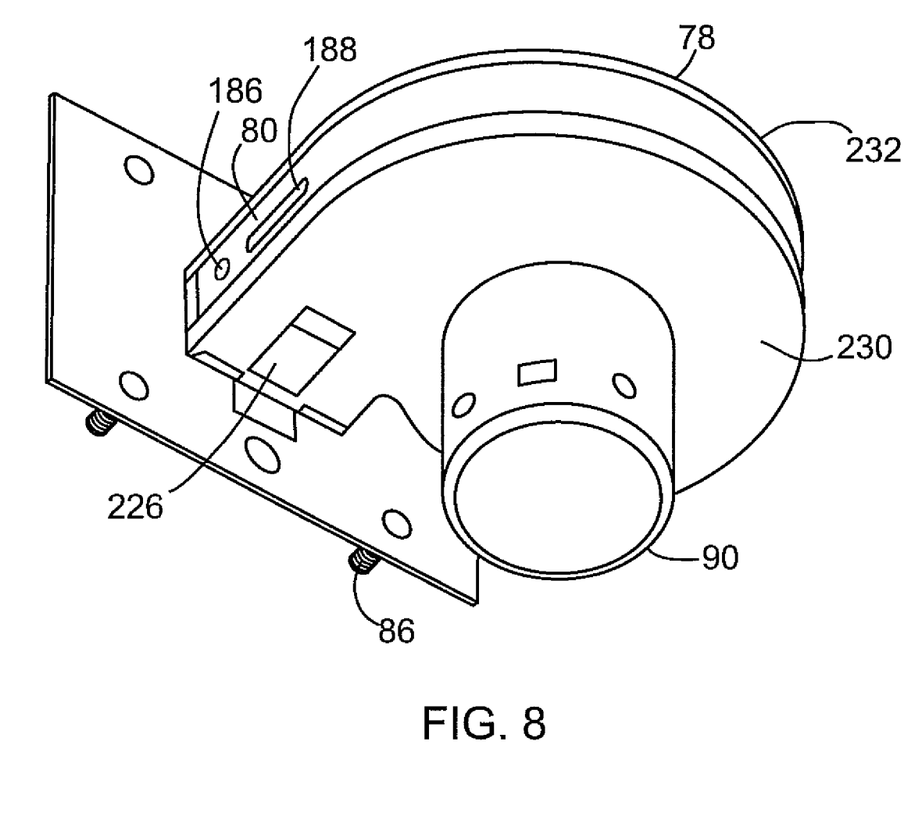
FIG. 8 is a perspective view of the blower and its mounting flange, this view being taken from the motor side of the blower and showing the upstream side of the flange.

FIG. 8 illustrates a rectangular side opening 226 formed in the outlet section of the blower casing. It will be understood that the gas line that extends from the gas valve unit to the gas nozzle extends through this opening which is sealed off around the gas line. The blower has two opposing side walls 230, 232 extending perpendicular to the axis of rotation of the fan 75 of the blower. The opening 226 is formed in the side wall 230 adjacent the downstream end of the blower outlet section 80.

While the present invention has been illustrated and described as embodied in certain exemplary embodiments, it is to be understood that the present invention is not limited to the details shown herein, since it will be understood that various omissions, modifications, substitutions and changes in the form and details of the disclosed heating assembly and pitot tube assembly can be made by those skilled in the art without departing in any way from the spirit and scope of the present invention. For example, those with ordinary skill in the art will readily adapt the present disclosure for various other applications without departing from the spirit and scope of the present invention.

The invention claimed is:

1. A heating assembly for a radiant tube heater having a radiant heating burner tube with an upstream end, said heating assembly comprising:

a mixing cup assembly adapted for mounting within said burner tube and adapted for mixing primary air and combustible gas and for delivering the resulting mixture into an upstream end section of the burner tube;

gas line means for introducing said combustible gas into said mixing cup assembly, said gas line having an upstream first end and a downstream second end terminating in the mixing cup assembly;

a gas valve unit adapted for connection to said first end of said gas line and for regulating flow of said combustible gas to said mixing cup assembly;

a blower for providing said primary air for combustion to said mixing cup assembly, said blower including a blower housing with a blower outlet section adapted for connection to the upstream end of the burner tube;

a pressure sensor system for controlling the gas valve unit, said sensor system including differential pressure switch means for controlling operation of the gas valve unit, and a pitot tube assembly mounted on said blower outlet section so as to extend through a wall of said outlet section, said pitot tube assembly being operatively connected to said pressure switch means and including first and second substantially L-shaped pitot tubes having respective inner leg sections located within said blower outlet section and extending in opposite directions to their respective pressure-sensing ends, said first pitot tube being adapted to and mounted to measure impact pressure created by said blower during use of the heating assembly and said second pitot tube being adapted to and mounted to measure static pressure during use of the heating assembly, wherein said pitot tube assembly is adapted to sense pressure changes and to provide details of said changes to said differential pressure switch means.

2. A heating assembly according to claim 1 wherein said blower outlet section has a mounting flange plate on a downstream end thereof for connecting said blower housing to said upstream end of the burner tube and the inner leg section of the second pitot tube extends through a blower outlet opening formed at said mounting flange plate.

3. A heating assembly according to claim 1 wherein said pitot tube assembly includes a mounting plate through which said first and second pitot tubes extend and in which the pitot tubes are mounted and fastener means for detachably connecting said mounting plate to an outer wall of the blower outlet section spaced furthest from an axis of rotation of a fan of said blower.

4. A heating assembly according to claim 3 wherein said blower outlet section has a hole and an elongate slot formed in said outer wall thereof, said first pitot tube extends through said slot and said second pitot tube extends through said hole, and wherein said mounting plate closes off any gap or opening formed by said hole and said slot after insertion of the pitot tubes into said hole and said slot.

5. A heating assembly according to claim 2 wherein said blower outlet section has two opposing side walls extending perpendicular to an axis of rotation of a fan of the blower, an access opening is formed in one of said sidewalls adjacent a downstream end of said blower outlet section, and said gas line means extends through said access opening and into said blower outlet section.

6. A heating assembly according to claim 1 wherein said mixing cup assembly includes a burner nozzle operatively connected to said second end of the gas line means and a burner head having cylindrical inlet and outlet portions, said burner nozzle extending into and connected to the inlet portion, said outlet portion having a larger diameter than said inlet portion and containing a perforated ceramic tile through which said mixture of primary air and gas can flow during use of the heating assembly.

7. A heating assembly according to claim 6 wherein said inlet portion of the burner head has airflow openings distributed about its cylindrical periphery for passage of primary air into the burner head, said inlet and outlet portions are connected together by an integral, annular, radial wall, and a plurality of apertures are formed in said radial wall around its circumference for flow of said primary air into said outlet portion.

8. A radiant tube heater comprising:

an elongate tubular arrangement including an air duct portion forming a combustion air passage and a radiant tube portion which is heated by and surrounds a laminar flame during use of the heater and which extends downstream of said air duct portion in relation to the flow of combustion air in said air passage, said air duct portion having an inlet at one end for receiving combustion air;

a blower for providing pressurized combustion air to said inlet of said air duct portion, said blower being adapted for connection in a sealing manner to said air duct portion and including a blower casing with an outlet section and an attachment arrangement for connecting said outlet section to said air duct portion at said inlet;

a burner assembly mountable in said air duct portion, said assembly including a burner head for mixing combustible gas delivered to said burner head and combustion air and for providing the resulting mixture to said radiant tube portion for controlled burning;

gas valve means for regulating flow of said combustible gas to said burner assembly, said gas valve means being connectible to said burner assembly via a gas line; and a pressure sensor system for the gas valve means, said sensor system including differential pressure switch means for controlling operation of said gas valve means and a pitot tube assembly mountable on said outlet section of the blower so as to extend through a wall of the outlet section, said pitot tube assembly being operatively connected to said pressure switch means and including first and second substantially L-shaped pitot tubes having respective inner leg sections located within said blower outlet section and extending in opposite directions to their respective pressure sensing ends, said first pitot tube being provided to measure impact pressure created by said blower and the second pitot tube being provided to measure static pressure during use of the tube heater.

9. A radiant tube heater according to claim 8 wherein said attachment arrangement includes a connecting flange at an outlet end of said outlet section of the blower and the inner leg section of the second pitot tube extends through a blower outlet opening formed at the connecting flange.

10. A radiant tube heater according to claim 8 wherein said pitot tube assembly includes a mounting plate through which said first and second pitot tubes extend and in which the pitot tubes are mounted and fastener means for detachably connecting said mounting plate to an outer wall of the blower outlet section spaced furthest from an axis of rotation of a fan of said blower.

11. A radiant tube heater according to claim 10 wherein said outer wall has a hole and an elongate slot formed therein, said first pitot tube extends through said slot and said second pitot tube extends through said hole, and wherein said mounting plate closes off any gap or opening formed by said hole and said slot after insertion of the pitot tubes into said hole and said slot.

12. A radiant tube heater according to claim 8 wherein said burner assembly includes a burner nozzle operatively connected to said gas valve means by said gas line, said burner head has cylindrical inlet and outlet portions with said burner nozzle extending into and connected to said inlet portion, and said outlet portion has a larger diameter than said inlet portion and contains a perforated ceramic tile through which said resulting mixture flows during use of the tube heater.

13. A pitot tube assembly for a radiant tube heater having a blower for providing combustion air to a burner assembly, said pitot tube assembly comprising:

a mounting plate for attaching said pitot tube assembly to a wall of a housing of said blower; and first and second, substantially L-shaped pitot tubes extending through said mounting plate and being connected thereto and having respective inner leg sections, which are arranged within an outlet section of said blower during use of the radiant tube heater and which extend in opposite directions to their respective pressure sensing ends, said first pitot tube being adapted to measure impact pressure created by said blower and said second pitot tube being adapted to measure static pressure during use of the blower; and said mounting plate is flat and is sized to close both a relatively small hole and a separate, larger, elongate slot in said wall of the housing during use of the pitot tube assembly when said first pitot tube extends through the slot and said second pitot tube extends through said relatively small hole;

wherein said pitot tubes are adapted for connection to differential pressure switch means for controlling operation of the burner assembly.

* * * * *